United States Patent [19]

Miller et al.

[11] Patent Number: 5,351,325
[45] Date of Patent: Sep. 27, 1994

[54] NARROW BAND MACH-ZEHNDER FILTER

[75] Inventors: William J. Miller; Daniel A. Nolan, both of Corning, N.Y.

[73] Assignee: Corning Incorporated, Corning, N.Y.

[21] Appl. No.: 52,523

[22] Filed: Apr. 29, 1993

[51] Int. Cl.$^5$ .............................. G02B 6/26; G01B 9/02
[52] U.S. Cl. ............................ 385/42; 385/24; 385/27; 385/31; 385/43; 356/345
[58] Field of Search ................ 385/1, 2, 3, 8, 9, 15, 385/24, 27, 31, 32, 30, 39, 40, 41, 42, 43, 46; 356/345

[56] References Cited

U.S. PATENT DOCUMENTS

| | | | |
|---|---|---|---|
| 4,307,933 | 12/1981 | Palmer et al. | 385/42 X |
| 4,671,605 | 6/1987 | Soref | 385/2 X |
| 4,900,119 | 2/1990 | Hill et al. | 385/32 X |
| 4,979,790 | 12/1990 | Walker | 385/14 X |
| 5,044,715 | 9/1991 | Kawachi et al. | 385/40 X |
| 5,119,453 | 6/1992 | Gonthier et al. | 385/43 |
| 5,122,852 | 6/1992 | Chan et al. | 385/15 X |
| 5,251,277 | 10/1993 | Young, Jr. | 385/42 X |
| 5,295,205 | 3/1994 | Miller et al. | 385/43 X |

FOREIGN PATENT DOCUMENTS

| | | | |
|---|---|---|---|
| 0382461 | 8/1990 | European Pat. Off. | 385/24 X |
| 3144723 | 5/1983 | Fed. Rep. of Germany | 385/24 X |

*Primary Examiner*—Brian Healy
*Attorney, Agent, or Firm*—William J. Simmons, Jr.

[57] ABSTRACT

A Mach-Zehnder filter includes an input coupler for splitting an input signal into N equal output signals, where N>2, and a signal combining coupler for combining N optical signals into a single output signal. It further includes N optical waveguide fibers for connecting the N outputs from the input coupler to the signal combining coupler. Each of the N optical fibers subjects the light propagating therethrough to a delay that is different from the delay experienced by light propagating through each of the other optical fibers. This Mach-Zehnder filter exhibits greater finesse per stage than previous Mach-Zehnder devices, finesse being the ratio of the wavelength separation between adjacent peaks to the peak widths.

13 Claims, 6 Drawing Sheets

NARROW BAND MACH-ZEHNDER FILTER

BACKGROUND OF THE INVENTION

The present invention relates to Mach-Zehnder filters and more particularly to Mach-Zehnder filters that are characterized by narrow peaks and wide separation between peaks.

There is an emerging need for narrowband filters. Such devices are needed in the 1550 nm window for modifying the Gain spectrum of erbium fiber amplifiers. They will also be widely used in trunk lines as well as in fiber-to-the-subscriber architectures.

There is a need for both wavelength tunable components and fixed wavelength components. In an all optical network, for example, the device can be tuned at the receiver end in order to detect the desired incoming signal. In a second approach, tunable lasers are used to send a plurality of signals, and the desired signal is detected by employing a receiver having a fixed filter. The transmission system could also employ both fixed lasers and filters. The wavelength separation capabilities of such filters needs to be on the order of tens of nanometers to as small as a nanometer. Moreover, these components will need to be environmentally stable and very reliable.

The Mach-Zehnder filter is known for its narrowband wavelength capabilities. It has been proposed that filters having pass bands as narrow as 1 nm be formed by connecting two evanescent couplers with unequal fiber lengths between them. See OFC Conference on Optical Fiber Communication, Minitutorial Sessions, Jan. 22–26, 1990, page 256 (part of a presentation on "Dense WDM Techniques" by C. A. Brackett), and P. E. Green, Fiber Optic Networks, Prentice Hall, 1993, pp. 123.

FIG. 1 shows a schematic diagram of a conventional Mach-Zehnder filter. Two couplers $C_1$ and $C_2$ are concatenated by optical waveguide paths or fibers $F_1$ and $F_2$. For the sake of simplicity, optical fibes will usually be discussed. The couplers for this conventional Mach-Zehnder device, which are typically evanescent type couplers, are usually 3 dB couplers, whereby the optical power that is applied to input port 2, for example, is equally divided between the two outputs of coupler $C_1$. Mach-Zehnder devices can also employ non-evanescent planar couplers; see S. I. Najafi, *Introduction to Glass Integrated Optics*, Artech House, 1992, pp. 156–160. For certain types of filters, one or more of the couplers can unequally split the input power. One of the fibers has means OPLD to impart to it an optical path length difference so that there is a phase shift between the two input signals that are applied to coupler $C_2$. A phase shift can be induced by employing fibers having different lengths or different refractive index profiles, or by inserting phase shifting means into one of the waveguide paths.

The power output at port 3 can be written as $$P = \cos^2(\pi \cdot \Delta L_P / \lambda) \qquad (1)$$

where $\Delta L_P$ is the optical path length difference (OPLD) between the paths connecting the two couplers. Therefore, the device response is periodic function of inverse wavelength, and the output power spectrum thereof is similar to that illustrated in FIG. 2. The wavelength separation between the peaks 12 in FIG. 2 would be halved if $\Delta L_P$ were doubled.

Two commonly employed techniques for achieving an OPLD are (1) providing connecting fibers $F_1$ and $F_2$ having different lengths, and/or (2) providing connecting fibers $F_1$ and $F_2$ that propagate light at different speeds, usually by providing fibers with different cores. For case (1) where identical fibers have different lengths, equation (1) becomes $$P = \cos^2(\pi \cdot n \Delta L / \lambda) \qquad (2)$$

where n is the refractive index of the fiber cores, and $\Delta L$ is the difference in the lengths of the fibers in the phase shift region that interconnects the couplers $C_1$ and $C_2$. The optical path length of an optical fiber can be changed by heating, bending, stretching or the like. The optical path length of a planar optical waveguide path formed of electro-optic material can be changed by applying an electric field to it.

For case (2), where connecting fibers $F_1$ and $F_2$ have different core refractive indices, equation (1) becomes $$P = \cos^2(\pi \cdot L \cdot \Delta n / \lambda) \qquad (3)$$

where L is the length of fibers $F_1$ and $F_2$ in the phase shift region that interconnects the couplers $C_1$ and $C_2$, and $\Delta n$ is proportional to the refractive index difference between the two fiber cores and is approximately equal to $f \cdot n_2 (\Delta_2 - \Delta_1)$, where $\Delta_1$ and $\Delta_2$ are the $\Delta_{1-2}$ values of fibers $F_1$ and $F_2$, respectively. The term $\Delta_{1-2}$ is the relative refractive index difference between the core and cladding of a given fiber and is equal to $(n_1^2 - n_2^2)/(2n_1^2)$, $n_1$ and $n_2$ being the fiber core and cladding refractive indices, respectively. The factor f takes into account the fact that the phase shift is proportional to the so-called "effective" refractive index which depends on both the fiber $\Delta_{1-2}$ value as well as the core diameter. Equation (3) then becomes $$P = \cos^2(\pi \cdot L \cdot f \cdot n_2 (\Delta_2 - \Delta_2) / \lambda) \qquad (4)$$

where $n_1$ is the core refractive index and the value of $f \cdot n_1$ can be taken to be approximately 1 if the core diameters are essentially equal. Equation 4 is plotted in FIG. 2, for a single-stage Mach-Zehnder filter in which fiber $F_1$ has a $\Delta_{1-2}$ value of 0.3% and fiber $F_2$ has a $\Delta_{1-2}$ value of 1.0%, the optical path length L (the length of each of the fibers $F_1$ and $F_2$ between couplers $C_1$ and $C_2$) being 2 cm.

Mach-Zehnder devices in which an optical path length difference is obtained by employing two concatenating fibers $F_1$ and $F_2$ of identical length but different core refractive indices are taught in U.S. patent application Ser. No. 08/038,244 (W. J. Miller et al. 10–13) "Monolithic Mach-Zehnder Device" filed Mar. 29, 1993, now U.S. Pat. No. 5,295,205, and the publication B. Malo et al. "Unbalanced Dissimilar-Fibre Mach-Zehnder Interferometer: Application as a Filter" Electronics Letters, 12th Oct. 1989, Vol. 25, No. 21, pp. 1416–1417.

If multiple devices are serially cascaded, as shown in FIG. 3, the total response is simply a product of terms like those in equations (1), (3) or (4). If the optical path length difference of one of the devices is chosen such that it is a multiple of the other, e.g. if OPLD-2 is a multiple of OPLD-1, a narrow band filter response results. Every other peak remains, the intervening wavelengths between peaks being substantially eliminated, as shown in FIG. 4, which is a graph of the calculated output power for a two-fiber, two-stage Mach-Zehnder device in which $\Delta_1$ is 0.003, $\Delta_2$ is 0.01, $L_1$ is 1 cm and $L_2$ is 2 cm. The cascading of additional Mach-Zehnder devices increases the wavelength separation between peaks. The sharpness of the peaks is controlled by the Mach-Zehnder with the largest optical path length difference. Therefore a larger OPLD provides a sharper peak. The distance between peaks is a function of the number of cascaded devices and the relative optical path length differences in each stage. The improvement in filtering properties achieved by the device illustrated in FIG. 3 as compared with that illustrated in FIG. 1, i.e. the improvement in the filtering properties illustrated in FIG. 4 as compared with the properties illustrated in FIG. 2, is known as "finesse" which is defined as the ratio of the wavelength separation between adjacent peaks to the peak widths. Greater finesse is achieved as the number of cascaded Mach-Zehnder devices is increased.

Mach-Zehnder filters of the type shown in FIGS. 1 and 3 are tunable. The peaks are shifted by changing the OPLD's. Therefore, such a device could be used to tune to various optical wavelengths as radio receiver is tuned to radio wavelengths.

SUMMARY OF THE INVENTION

It is an object of the present invention to provide a Mach-Zehnder device that exhibits greater finesse per stage than previous devices.

Briefly, the present invention relates to a Mach-Zehnder filter having input coupler means for splitting an input signal into N equal output signals, where $N>2$. Further means is provided for combining N optical signals into a single output signal. An optical waveguide path connects each of the N coupler means outputs to the combining means. Each of the N waveguide paths subjects the light propagating therethrough to a delay that is different from the delay experienced by light propagating through each of the other waveguide paths.

DESCRIPTION OF THE PREFERRED EMBODIMENTS

The drawings are not intended to indicate scale or relative proportions of the elements shown therein.

Figure 5:
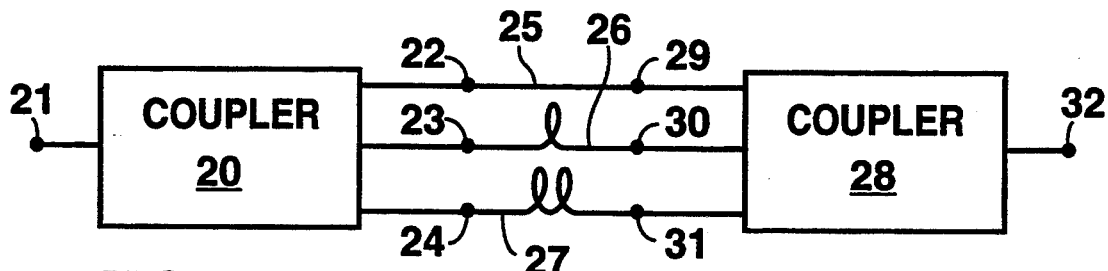
FIG. 5 is a schematic diagram of a Mach-Zehnder device formed in accordance with the present invention.

A Mach-Zehnder device in accordance with the present invention is schematically illustrated in FIG. 5. Coupler 20 has at least one input port 21 and at least three output ports 22, 23, and 24. The function of coupler 20 is to split the input signal into N output signals ($N>2$) of equal power. Coupler 28 has at least three input ports 29, 30 and 31 and at least one output port 32. Output ports 22, 23, and 24 are connected to input ports 29, 30 and 31, respectively, by optical optical waveguide paths 25, 26 and 27, respectively, which are fibers, planar structures, or the like. Coupler 28 functions as means for combining the N output signals from coupler 20. The characteristics of the connecting waveguides are such that these N output signals from coupler 20 are differentially delayed, i.e. each of the waveguide paths 25, 26 and 27 has a different optical path length. As discussed above, this can be achieved by employing optical fibers of different lengths, by employing optical fibers of identical lengths but having different refractive index profiles, or by inserting optical delay devices in at least two of the fibers. Methods for determining the relationships between the various delays are described below. Whereas the connecting waveguides are illustrated by way of example as being three connecting fibers, four or more such fibers can be employed with increasing benefit. Couplers 20 and 28 must be adapted to accomodate the number of connecting fibers.

Couplers 20 and 28 can be evanescent couplers of the fused biconic taper, the overclad or the planar type, or they can be non-evanescent couplers of the type described in the aforementioned Najafi publication. Suitable overclad couplers are disclosed in U.S. Pat. Nos. 4,902,324, 4,983,195 and 5,017,206.

Figure 7:
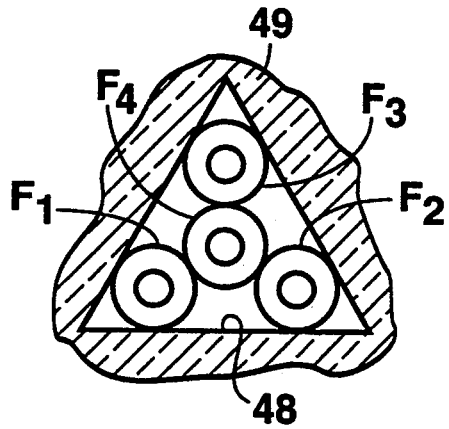
FIG. 7 is a partial cross-sectional view of a coupler preform.

The Mach-Zehnder device of the present invention is advantageously formed as a monolithic structure (FIG. 6) that contains concatenated overclad couplers 41 and 42 that are joined by a phase shifting region 44. The device is formed by inserting optical fibers $F_1$, $F_2$, $F_3$ and $F_4$ into the bore 48 of a tube of matrix glass 49 to form a coupler preform. Fibers $F_1$, $F_2$ and $F_3$ are equally spaced around fiber $F_4$ as shown in FIG. 7. Each of the optical fibers has a core surrounded by cladding of refractive index lower than that of the core. The cores of fibers $F_1$, $F_2$ and $F_3$ may have different refractive indices, $n_{1-2}$, $n_{2-2}$ and $n_{2-3}$, respectively, or the claddings of those fibers may have different refractive indices, $n_{2-1}$, $n_{2-2}$ and $n_{2-3}$, respectively. It is preferred that the fiber cores have different refractive indices since the core refractive index has a greater effect on the propagation constant (and thus the velocity of propagation through the fiber) in phase shifting region 44, but it has little effect on the propagation constant of the fiber in the coupling region. The same effect can be achieved by employing fibers $F_1$, $F_2$ and $F_3$ having different core diameters. The refractive index $n_3$ of that portion of the matrix glass tube adjacent the fibers is less than the lowest refractive index of any of the fiber claddings. The bore can be provided with funnels (not shown) at each end to facilitate insertion of the fibers.

Figure 8:
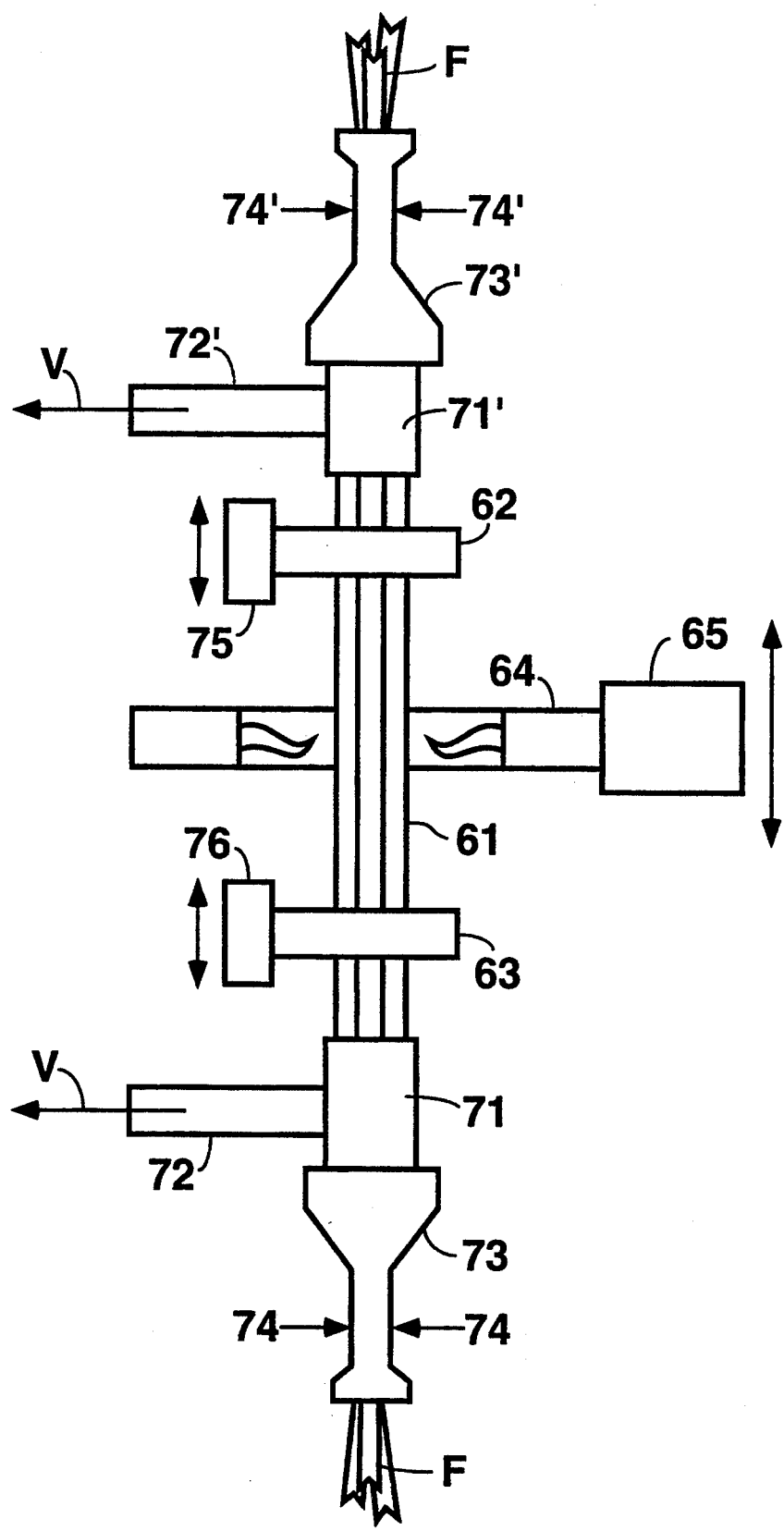
FIG. 8 is a schematic illustration of an apparatus for collapsing a capillary tube onto fibers and stretching the tube to form a coupling region.

The coupler preform can be further processed in the draw apparatus of FIG. 8. Preform 61 is inserted through ring burner 64 and is clamped to draw chucks 62 and 63 which are mounted on motor controlled stages 75 and 76. The fibers F are threaded through the vacuum attachments 71 and 71', which are then sealed to the ends of preform 61. Typical vacuum attachments are disclosed in U.S. Pat. No. 5,011,251 which is incorporated herein by reference. Vacuum is supplied to vacuum attachment 71 through line 72. One end of a length of thin rubber tubing 73 is attached to that end of vacuum attachment 71 opposite preform 61; the remaining end of the tubing extending within tube clamping means (not shown). Upper vacuum attachment 71' is similarly associated with line 72', tubing 73' and tube clamping means. Coated portions of fibers F extend from tubing 73 and 73', the fiber portions within the tube between points a and b being uncoated. When air pressure is directed against tubing 73 and 73' as indicated by arrows 74, 74', to clamp the tubing against the fibers extending therethrough, bore 48 is evacuated through lines 72 and 72'.

In one embodiment, that portion of the tube between points a and b is initially collapsed onto the fibers. After the preform is affixed to chucks 62 and 63, and the tube bore is evacuated, the tube is heated near a first end 53 to cause it to collapse at the region of applied heat. Chucks 62 and 63 move the preform relative to the burner to gradually extend the collapsed region toward end 54 until the desired length of collapsed tube is obtained.

In an alternative process, chucks 62 and 63 can be fixed, and burner 64 can be mounted on a motor controlled stage 65. Burner 64 is initially positioned near end 53 to cause it to collapse; stage 65 moves the burner relative to the preform to extend the collapsed region toward end 54.

Thereafter, coupler 41 is formed near end 53 of the tube by heating a region of the tube and moving computer controlled stages 75 and 76 in opposite directions to stretch the heated region. The tube stretching operation can be performed in accordance with U.S. Pat. No. 5,011,251. Region 51 is illustrated as having a constant diameter even though a slight taper exists therein, whereby the longitudinal center of region 51 exhibits the minimum diameter. It is well known that the coupling characteristics of the resultant coupler are determined by such parameters as the optical and mechanical characteristics of matrix glass 49 and fibers $F_1$, $F_2$, $F_3$ and $F_4$ and of the coupler parameters such as the length and shape of the neckdown and tapered regions.

While stretching the tube to form prototype couplers, optical power can be coupled to an input optical fiber, and the output signals from the coupler can be monitored to control process steps in the coupler manufacturing process. Prototype couplers are initially elongated by some distance determined by previous experience. The optical characteristics of the resultant device are measured, and the stretching or elongation distance of subsequently made couplers are adjusted in such a manner as to more nearly achieve the desired characteristics. By this process, the optimal stretching distance is achieved.

For best performance as a filter, couplers 41 and 42 have substantially identical coupling characteristics. The second coupler 42 is therefore preferably formed near tube end 54 by subjecting the appropriate region of the tube to stretching conditions that are identical to those used to form the first coupler.

In overclad and fused biconic tapered couplers employed in the filter of this invention, power should couple well from the input fiber to the output fibers, but the output fibers should be substantially isolated from each other. Referring to FIG. 7, ring fibers $F_1$, $F_2$ and $F_3$ are equally spaced around central fiber $F_4$ and are in contact with fiber $F_4$. Each ring fiber therefore couples well to fiber $F_4$ but not to adjacent ring fibers.

Figure 9:
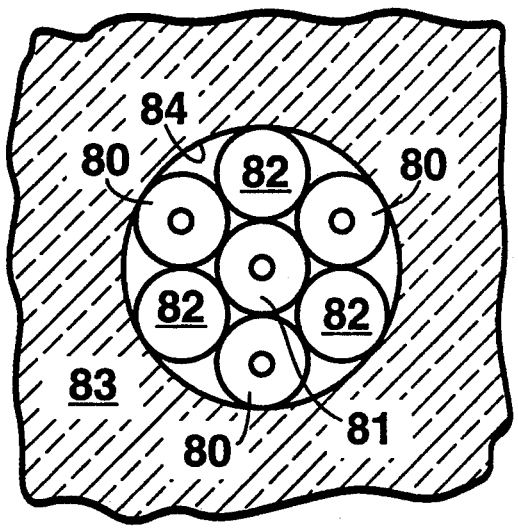
FIGS. 9 and 10 are partial cross-sectional views of a coupler preforms.

A method of increasing the isolation between adjacent ring fibers is illustrated in FIG. 9. Ring fibers 80 and central fiber 81 are inserted into bore 84 of tube 83 to form a preform. Each of the optical fibers 80 and 81 comprises a core and cladding. A dummy fiber 82 is placed between adjacent ring fibers. The dummy fibers can consist entirely of a glass such as $SiO_2$ containing a dopant such as fluorine that decreases its refractive index with respect to the claddings of the ring optical fibers 80. In the resultant coupler, each low index dummy fiber forms a glass region that functions as a barrier which inhibits coupling between the adjacent ring fibers. This glass region could have the same refractive index as tube 83.

Figure 10:
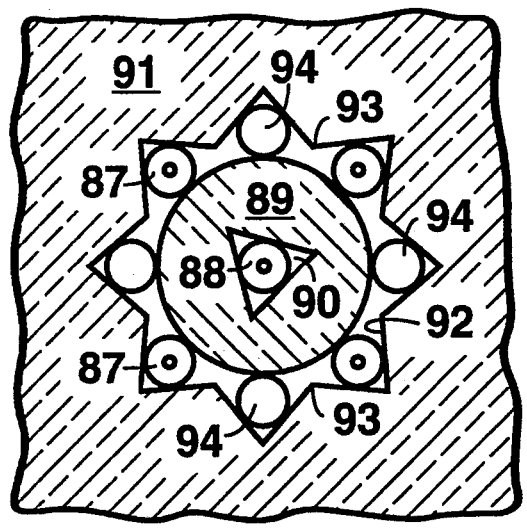

Four or more ring optical fibers 87 could be equally disposed around a central optical 88 as shown in FIG. 10. Circularly cylindrical inner tube 89 is provided with an aperture 90 that receives fiber 88. Outer tube 91 has an aperture 92 containing inwardly projecting, equally spaced, longitudinally extending protrusions 93. Optical fibers 87 and dummy fibers 94 are alternately disposed between protrusions 93.

A low index barrier could also be formed by drawing the coupler under such conditions that airlines remained between adjacent ring fibers. For example, if some of the region between tubes 89 and 91 did not collapse when the coupler was drawn, the resultant air space would function as an additional low index region between adjacent ring fibers 87.

Although couplers 41 and 42 can be achromatic or WDM type, the Mach-Zehnder device will be useful over a wider wavelength range if achromatic couplers are used. Various techniques can be used to obtain achromaticity.

In accordance with U.S. patent application Ser. No. 913,390 "Achromatic Overclad Fiber Optic Coupler" filed Jul. 15, 1992, now U.S. Pat. No. 5,268,979, a coupler can be made to be achromatic if the refractive index $n_2$ of the matrix glass body surrounding the coupling region is lower than $n_2$ by such an amount that the value of $\Delta_{2-3}$ is less than 0.125%, wherein $\Delta_{2-3}$ equals $(n_2^2 - n_3^2)/2n_2^2$. If the fiber claddings have different refractive indices, the lowest cladding refractive index is used to determine the value of $\Delta_{2-3}$.

Only one of the fibers of a Mach-Zehnder filter needs to extend from each end of the device. After the device is formed, the unneeded portions of the fibers that extend from the device may be severed. The severed ends are then preferably provided with antireflection terminations.

Antireflection terminations can be formed on each end of fibers $F_1$, $F_2$ and $F_3$ prior to forming the coupler preform in accordance with the teachings of U.S. Pat. No. 4,979,972. Each of these fibers can be cut to a length slightly longer than the length of the capillary tube, and it can be entirely stripped of coating material. An antireflection termination is formed by directing a flame near the end of the fiber and pulling and severing the fiber at the heated region. The tip of the heated region is heated by a burner flame to cause the glass to recede and form a rounded endface, the diameter of which is equal to or slightly smaller than the original uncoated fiber diameter. After antireflection terminations are formed at both ends of the fiber, its length is slightly shorter than the capillary tube. Fiber $F_4$, which has been stripped of coating in its central portion, is inserted through the bore of the matrix glass capillary tube along with the short sections of fibers $F_1$, $F_2$ and $F_3$. The device is thereafter formed as described above. One end of fiber $F_4$ functions as the input port, and the other end thereof functions as the output port of the resultant device.

In a Mach-Zehnder device of the type illustrated in FIG. 5, the wavelength separation between adjacent peaks is determined by the closest core deltas if the device employs equal length connecting fibers having different values of $\Delta_{1-2}$, or by the shortest length difference among the fibers if the device employs connecting fibers having different lengths. The longer length differences and larger spaced deltas give the higher frequency components of the spectra and determine the peak widths. In particular, the largest core delta separations and longest length stage determine the peak half widths.

Referring again to FIG. 5, best filtration is achieved when all of the power is equally coupled from the input waveguide to the output waveguides of coupler 20. Coupler 28 is similar to coupler 20, but the single port end is used as the output. The output spectra appearing at output port 32 of such a device can be obtained from the field amplitudes of the superimposed waves. If the device is of the type in which the phase shift region contains fibers of equal length but different refractive index profiles, the field amplitude of N such waves in the output fiber is:

$$\epsilon = (1 + \Sigma_2 \{\cos [2\pi(\Delta_N \Delta_1)L/\lambda] \rightleftarrows \sin [2\pi(\Delta_N - \Delta_1)L/\lambda]\})/N \quad (5)$$

wherein the $\Delta$-values, L and $\lambda$ are determined as follows. The length of the phase shift region is chosen. It is preferably no longer than about 2 cm to maintain the compactness of the overall device and to minimize thermal effects. It should be at least 0.5 cm long for easy fabrication. The device will obviously be operative if the length of the phase shift region is outside the preferred range of 0.5–2.0 cm. The application determines the wavelength separation of the peaks. A standard telecommunication fiber can be used for fiber $F_1$, whereby the value of $\Delta_1$ is known. The length L, wavelength separation and $\Delta_1$ being known, equation (4) is solved for $\Delta_2$. The value of $\Delta_i$ is then given by $$\Delta_i = \Delta_1 + (i-1)(\Delta_2 - \Delta_1) \quad (6)$$

For example, if $\Delta_1$ and $\Delta_2$ are 0.3% and 1.0%, respectively, then $\Delta_3$ is calculated to be 1.7%. For this specific device in which there are three connecting fibers, N is 3 and $\Delta_N$ is 1.7%.

Figure 6:
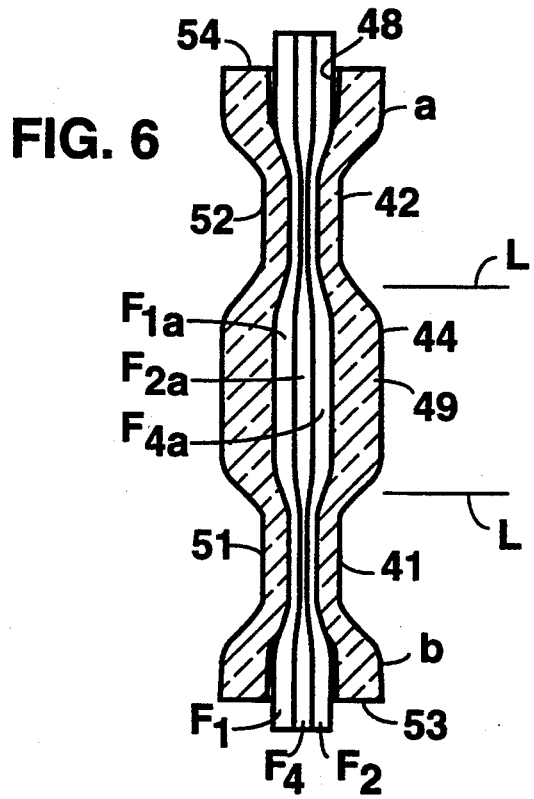
FIG. 6 is a cross-sectional view of a monolithic overclad Mach-Zehnder device having three concatenating fibers.

Referring to FIGS. 6 and 7, the $\Delta$-values in equation (5) are the core/cladding deltas $\Delta_1$, $\Delta_2$ and $\Delta_3$ of fibers $F_1$, $F_2$ and $F_3$, respectively. Since no power propagates in fiber $F_4$ in the phase shift region, its $\Delta$ value is not a factor in equations (5) and (6) and can conviently be the same as one of the other fibers, e.g. it could be $\Delta_1$.

The normalized output is given as $$PF = \epsilon \cdot \epsilon^* \quad (7)$$

where $\epsilon$ and $\epsilon^*$ are the electric field and the complex conjugate electric field, respectively. For further discussion of Mach-Zehnder normalized output, see page 124 of the above-cited *Fiber Optic Networks*. Using equation (5) for the two fiber case, one obtains the same spectra as predicted by the simple cosine expression of equation (4).

Figure 11:
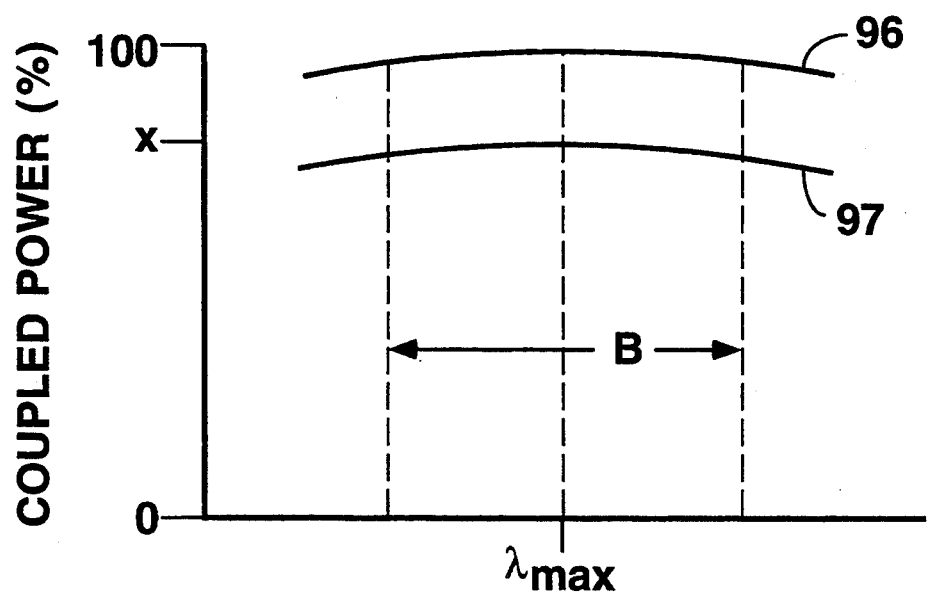
FIGS. 11-15 are plots of calculated output power v. wavelength for various embodiements of the invention.

Equation (5) is based on the assumption that essentially all of the light is coupled from input fiber $F_4$ to output fibers $F_1$, $F_2$ and $F_3$ (FIGS. 6 and 7). The relationship between coupled power and wavelength for coupler 41 is illustrated in FIG. 11. Curve 96 represents the power coupled out of input fiber $F_4$. If the central peak of the filter response curve (see peak 98 of FIG. 12, for example,) is centered at wavelength $\lambda$, then $\lambda_{MAX}$, the maximum point on curve 96, should be at wavelength $\lambda$. The slope of curve 96 should be such that coupled power decreases to no less than about 90% over the total wavelength region of interest. In this case the region of interest is a band B of about 70 nm. Such slopes are easily achieved with conventional couplers.

Figure 1:
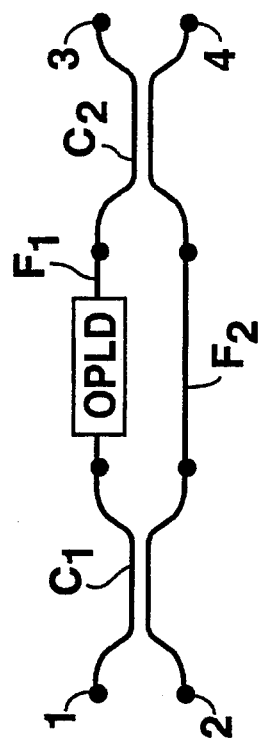
FIG. 1 is a schematic diagram of a Mach-Zehnder device.
Figure 2:
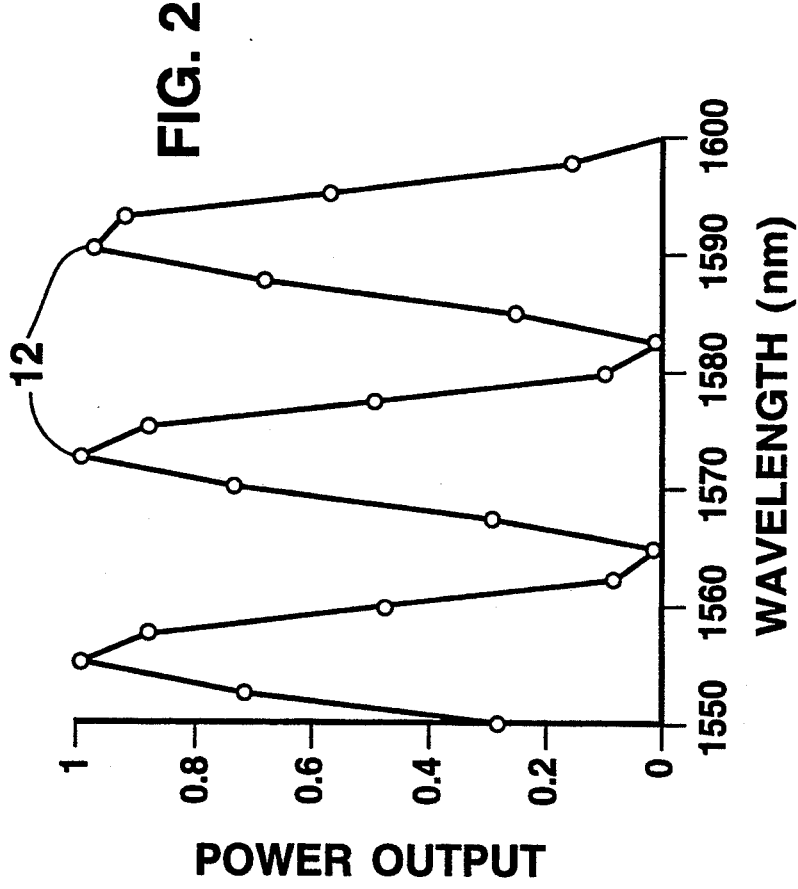
FIG. 2 is a plot of calculated output power v. wavelength for a single-stage two-fiber Mach-Zehnder filter.
Figure 3:
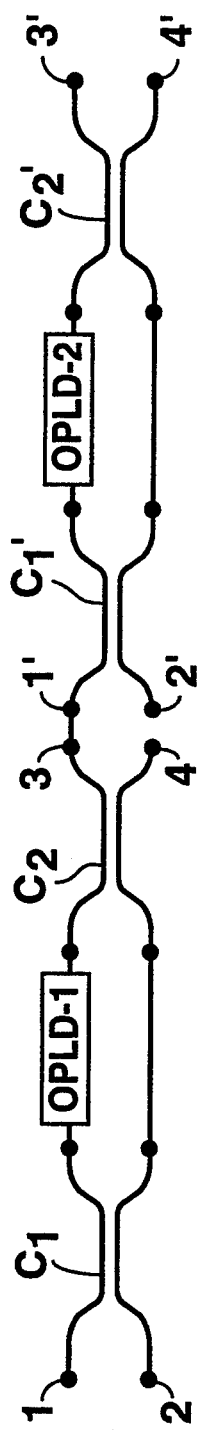
FIG. 3 is a schematic illustration of two concatenated two-fiber Mach-Zehnder devices.
Figure 4:
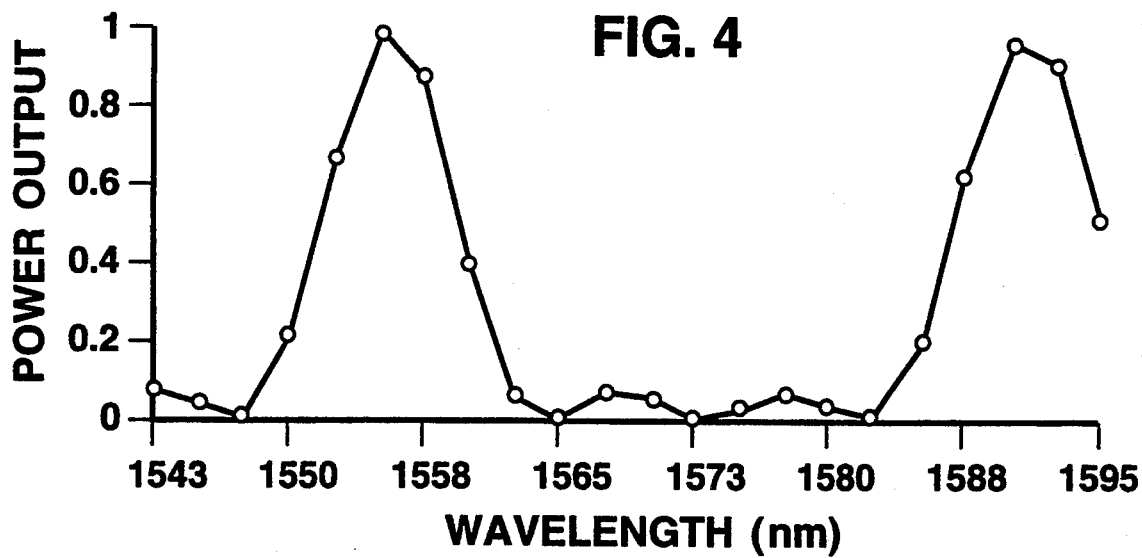
FIG. 4 is a plot of calculated output power v. wavelength for the Mach-Zehnder filter of FIG. 3.
Figure 12:
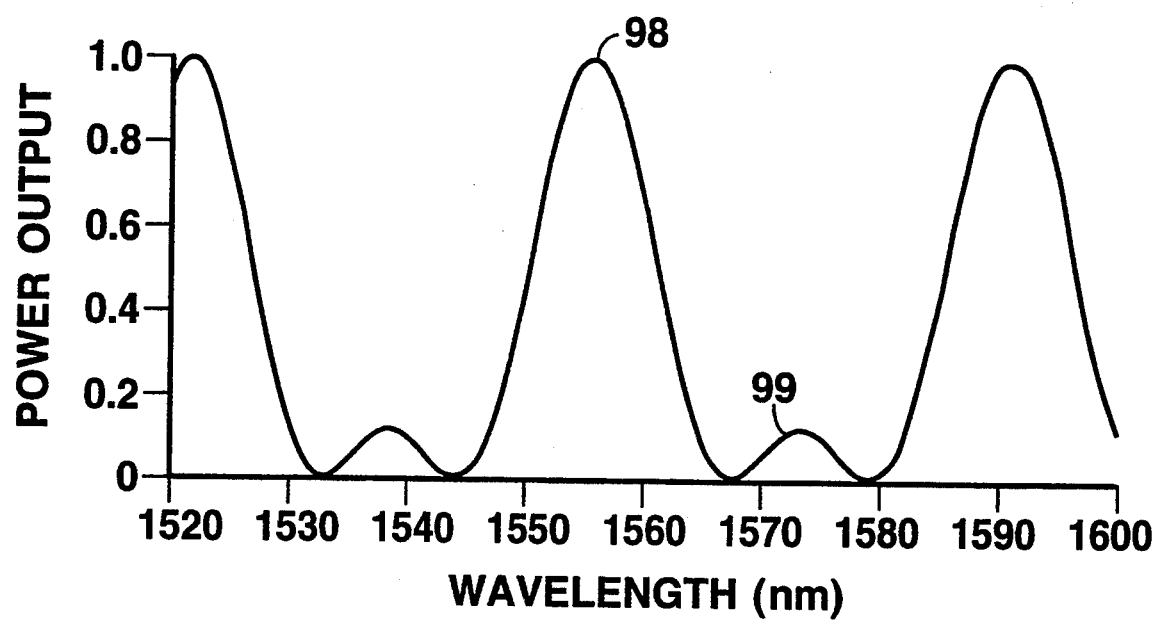

Equation (5) is plotted in FIG. 12 which shows the calculated output power v. wavelength plot for a three connecting fiber, single-stage Mach-Zehnder filter having a 1.0 cm long phase shifting region. The values of $\Delta_1$, $\Delta_2$ and $\Delta_3$ are 0.3%, 1.0% and 1.7%, respectively. The wavelength separation was selected to be 35 nm. The graph of FIG. 12 illustrates a significant improvement in finesse when compared to the two connecting fiber, single-stage device output shown in FIG. 2. The widths of the peaks are determined by the connecting fiber providing the greatest delay, i.e. by the fiber having the greatest $\Delta$-value.

Figure 13:
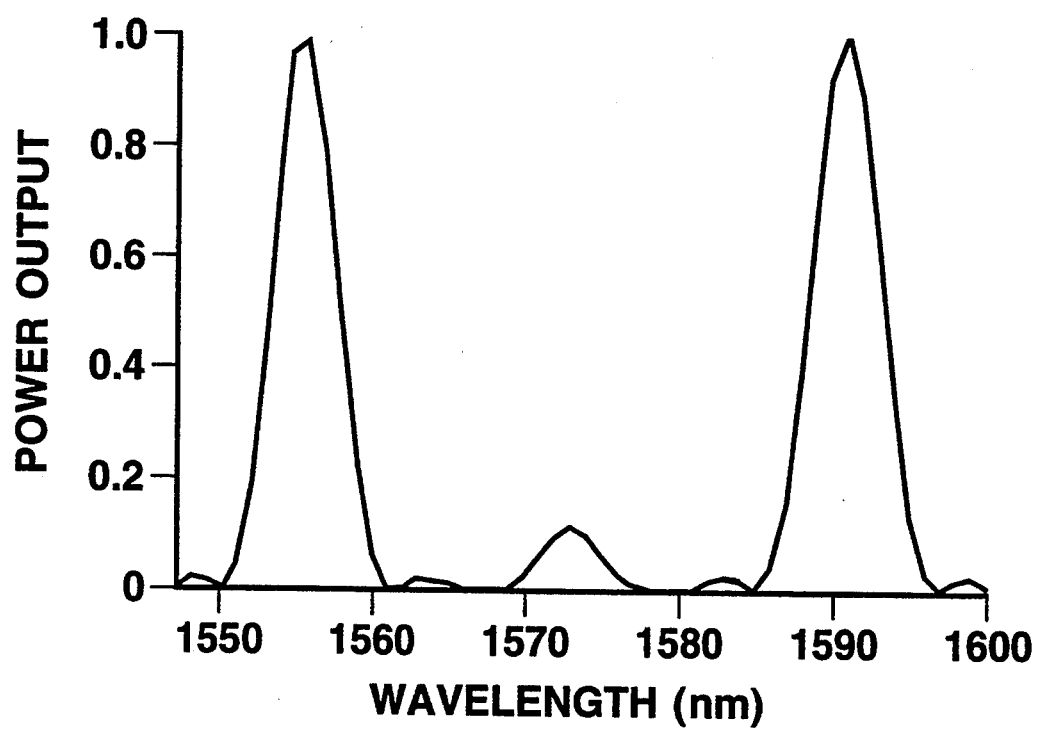

FIG. 13 shows the calculated output power v. wavelength plot for a three connecting fiber, double-stage Mach-Zehnder filter having the aforementioned $\Delta$ values and having 1.0 cm and 2 cm long phase shifting regions.

Figure 14:
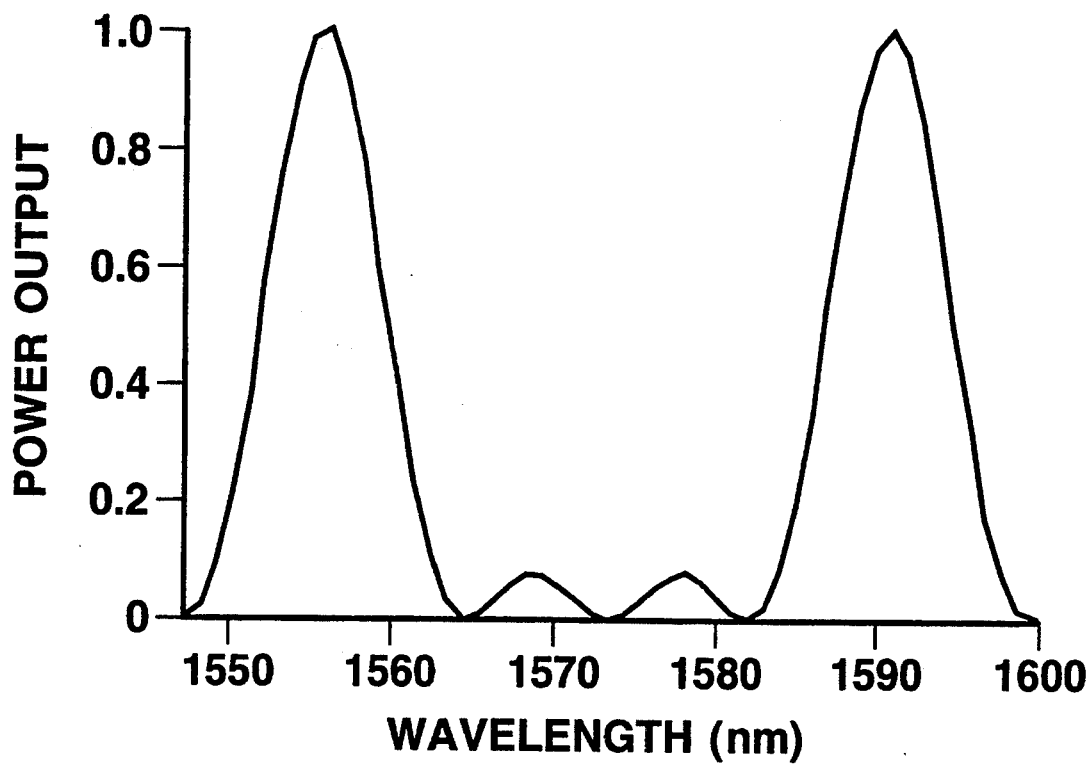

FIG. 14 shows the calculated output power v. wavelength plot for a four connecting fiber, single-stage Mach-Zehnder filter. Three of the connecting fibers have the delta values given above, and $\Delta_4$ of the forth connecting fiber is 0.024%. The length of the phase shifting region is 1 cm.

Figure 15:
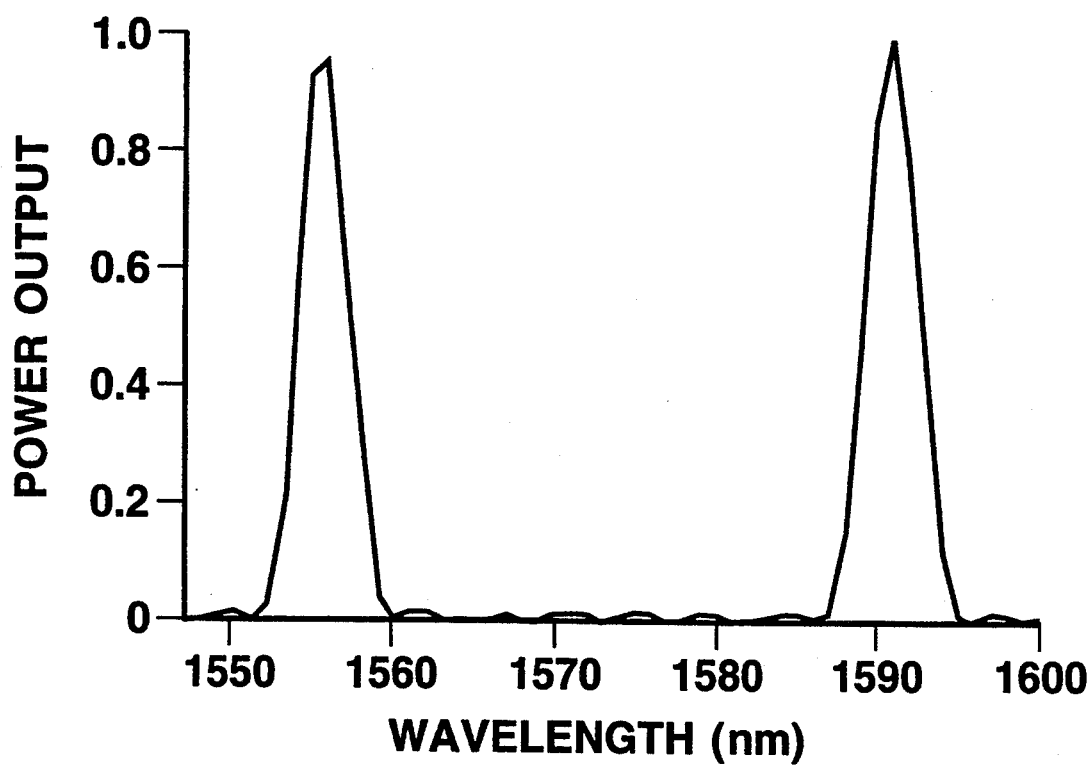

FIG. 15 shows the calculated output power v. wavelength plot for a four connecting fiber, double-stage Mach-Zehnder filter. The delta values are the same as for the previous example. The lengths of the phase shifting regions are 1 cm and 2 cm.

The ratio of the power output of the filter at peak 98 (see FIG. 12) to the the output power 99 in the spectral region between peaks is referred to as the "contrast ratio". Some applications require smaller contrast ratios than that of the filter response curve of FIG. 12. For example, it may be desired to maintain the between peak power in region 99 of FIG. 12 at some specific percentage such as 33% or 50% of the peak power. For such an application some of the input power must remain in the input fiber $F_4$ of coupler 41 of FIG. 6. More generally speaking, not all of the power applied to port 21 of FIG. 5 would be coupled to ports 23, 24 and 25. Equation (5) does not apply to such a Mach-Zehnder filter; additional terms would have to be added to equation (5) to cover this type of operation. The function would be similar, but the contrast ratio would change.

The reduction in coupled power should not be attained by operating at a point on curve 96 (FIG. 11) that is remote from the maximum coupled power point at $\lambda_{MAX}$ where coupled power is sufficiently low. Rather, if it is desired that x % (80%, for example) of the input power be coupled from the coupler input fiber, the coupler should be designed to have a spectral coupled power curve 97, with x % coupled power occurring at wavelength $\lambda_{MAX}$, as represented by curve 97 of FIG. 11. As previously discussed in connection with curve 96, curve 97 should experience only a relatively small decrease in coupled power over a wavelength band B.

To obtain less than 100% transfer of power from the input waveguide to the output waveguides of a coupler, as illustrated by curve 97, either the cladding of the central input fiber or the cladding of the output ring fibers (FIG. 7) can contain a dopant such as chlorine to change its refractive index. Less than 100% power transfer can also be achieved by employing ring fibers that have a different cladding diameter than that of the central fiber. In either case, the propagation constant of the central fiber is different from the propagation constants of the ring fibers in the coupling region.

If the optical fibers have identical refractive index profiles (identical light propagation speeds), then some technique must be employed to shift the phase of the signals propagating in the connecting region between the two couplers; e.g. the fibers can have different lengths in that region. For this embodiment, the field amplitude of the N superimposed waves in the output fiber becomes:

$$\epsilon = (1 + \Sigma_2 \{\cos[2\pi n(L_i - L_1)/\lambda] + \sin[2\pi n (L_i - L_1)/\lambda]\})/N \quad (8)$$

where n is the refractive index of the fiber cores. The lengths of the fibers in the phase shifting region are determined as follows, reference being made to FIG. 5. The length $L_1$ of the shortest fiber 25 and the length $L_2$ of the next shortest fiber 26 are initially selected by solving equation (2) for $\Delta L$ at two adjacent wavelengths at which a peak is desired, a plurality of solutions being obtained at each wavelength. The shortest values of $\Delta L$ that are common to each wavelength are chosen. This is well known in the field of Mach-Zehnder filters. The value of $L_i$ of any other fiber is then given by $$L_i = L_1 + (i-1)(L_2 - L_1) \quad (9)$$

The length $L_N$ of the longest connecting fiber in the phase shift region determines the peak half width.

As evidenced by FIG. 11, Mach-Zehnder devices formed in accordance with the invention exhibit greater finesse per stage than previous Mach-Zehnder devices.

The device of FIG. 5 can be tuned by including adjustable phase shift means in each of the connecting fibers 25, 26 and 27. If the phase shift in one path is adjusted, the phase shift in all but one of the remaining paths will need to be adjusted to maintain the phase shifts in accordance with the above relationships.

We claim:

1. A Mach-Zehnder filter for passing a signal, the wavelength spectrum of which is centered about a wavelength $\lambda_f$, said filter comprising
    input coupler means for splitting an input signal into N equal simultaneously propagating output signals, where N>2,
    combining means for combining N optical signals into a single output signal,
    N optical waveguide paths for connecting said N outputs to said combining means, each of said N waveguides subjecting the light propagating therethrough to a delay that is different from the delay experienced by light propagating through each of the other waveguides.

2. A filter in accordance with claim 1 wherein said waveguide paths have the same length and have different refractive index profiles.

3. A filter in accordance with claim 2 wherein each of said waveguide paths comprises a core region of refractive index $n_1$ surrounded by a cladding of refractive index $n_2$, the relative refractive index difference between the core and cladding of a waveguide path being characterized by a $\Delta$-value that is equal to $(n_1^2 - n_2^2)/(2n_1^2)$, the $\Delta$-values of a first path and a second path being $\Delta_1$ and $\Delta_2$, respectively, and $\Delta_i$, the $\Delta$-value of the ith path satisfying the relationship $\Delta_i = \Delta_1 + (i-1)(\Delta_2 - \Delta_1)$.

4. A filter in accordance with claim 1 wherein said waveguide paths comprise optical fibers having the same length and having different core diameters.

5. A filter in accordance with claim 1 wherein said waveguide paths have different lengths.

6. A filter in accordance with claim 5 wherein each of said waveguide paths comprises a core region of refractive index $n_1$ surrounded by a cladding of refractive index $n_2$, the relative refractive index difference between the core and cladding of a waveguide path being characterized by a $\Delta$-value that is equal to $(n_2^2 - n_2^2)/(2n_1^2)$, the $\Delta$-values all of said paths being equal, the length of a first and a second of said paths being $L_1$ and $L_2$, respectively, and $L_i$, the length of the ith path satisfying the relationship $L_i = L_1 + (i-1)(L_2 - L_2)$.

7. A filter in accordance with claim 1 wherein said input coupler means comprises a fused fiber coupler in which an input fiber is surrounded by N equally-spaced output fibers, said input fiber and said output fibers being fused together and tapered in a coupling region, the characteristics of which are such that light of said wavelength $\lambda_f$ propagating in said input fiber substantially completely couples to said output fibers.

8. A filter in accordance with claim 1 wherein said input coupler means comprises a fused fiber coupler in which an input fiber is surrounded by N equally-spaced output fibers, said input fiber and said output fibers being fused together and tapered in a coupling region, the characteristics of which are such that light of said wavelength $\lambda_f$ propagating in said input fiber does not completely couple to said output fibers.

9. A filter in accordance with claim 1 wherein said input coupler means comprises a fused fiber coupler in which an input fiber is surrounded by N equally-spaced output fibers, said input fiber and said output fibers being fused together and tapered in a coupling region, said coupler including means for preventing coupling between adjacent ones of said output fibers.

10. A filter in accordance with claim 9 wherein said means for preventing coupling comprises a glass region having a refractive index lower that that of said fiber claddings.

11. A filter in accordance with claim 9 wherein said means for preventing coupling comprises an air gap.

12. A Mach-Zehnder filter for passing a signal, the wavelength spectrum of which is centered about a wavelength $\lambda_f$, said filter comprising
    an elongated body of matrix glass,
    at least first and second and third dissimilar optical fibers extending longitudinally through said body, a phase shift region in said body in which all of said fibers have different propagation constants, whereby optical signals propagate through said optical fibers at different velocities in said phase shift region, two spaced coupler regions in said body at opposite ends of said phase shift region, the diameter of said body and the diameters of said fibers being smaller in said coupler regions than in said phase shift region.

13. A filter in accordance with claim 12 wherein all of said fibers have different refractive index profiles.

* * * * *